United States Patent [19]

Bonicel et al.

[11] 4,324,863

[45] Apr. 13, 1982

[54] FIRE-PROOFED INSULATING MATERIAL FOR AN ELECTRIC CABLE

[75] Inventors: Jean P. Bonicel, Lyons; Christian Cottevielle, Montreuil; Michel Maucolot, Nozay; Madeleine Prigent, Marcoussis, all of France

[73] Assignee: Societe Anonyme dite: Les Cables de Lyon, Lyons, France

[21] Appl. No.: 72,814

[22] Filed: Sep. 5, 1979

[30] Foreign Application Priority Data

Nov. 7, 1978 [FR] France ............................... 78 31467

[51] Int. Cl.[3] ............................................. C08V 9/00

[52] U.S. Cl. ..................................... 521/85; 428/389; 521/79; 521/92; 521/98; 521/143; 521/144; 521/907; 524/120; 524/412

[58] Field of Search ...................... 260/45.8 R, 45.7 P, 260/45.7 R; 521/907, 92, 85

[56] References Cited

U.S. PATENT DOCUMENTS

| | | | |
|---|---|---|---|
| 3,189,513 | 6/1965 | Calderwood et al. | 521/907 |
| 3,457,204 | 7/1969 | Burger et al. | 260/45.7 RL |
| 3,472,799 | 10/1969 | Burger et al. | 260/45.7 RL |
| 3,639,304 | 2/1972 | Roley Jr. | 521/907 |
| 3,655,589 | 4/1972 | Wingler et al. | 521/907 |
| 3,660,346 | 5/1972 | Groy et al. | 260/45.7 RL |
| 3,826,766 | 7/1974 | Howell et al. | 260/45.7 RL |
| 3,914,513 | 10/1975 | Brown et al. | 521/907 |
| 3,997,505 | 12/1976 | Albright | 260/45.8 R |
| 4,022,945 | 5/1977 | MacKenzie, Jr. et al. | 428/389 |
| 4,123,586 | 10/1978 | Betts et al. | 428/391 |

FOREIGN PATENT DOCUMENTS

| | | | |
|---|---|---|---|
| 1221949 | 2/1971 | United Kingdom | 428/489 |
| 1221950 | 2/1971 | United Kingdom | 428/489 |

*Primary Examiner*—Morton Foelak
*Attorney, Agent, or Firm*—Sughrue, Mion, Zinn, Macpeak & Seas

[57] ABSTRACT

A fire-proofed material for an electric cable, said material including a matrix made of a copolymer of propylene and of ethylene, high-density polyethylene or thermoplastic polyester, a fire-proofing agent which is halogenated and is formed by a cyclic derivative of pentaerythritol, an aliphatic or cyclo-aliphatic derivative which is stable at the extrusion temperature of the matrix and decomposes at a higher temperature and a mineral compound of antimony which is able to react with the bromine of the fire-proofing agent during combustion.

7 Claims, No Drawings

FIRE-PROOFED INSULATING MATERIAL FOR AN ELECTRIC CABLE

FIELD

The present invention relates to fire-proofed insulating material for an electric cable, as well as to an electric cable using such material.

BACKGROUND

Such materials are used in particular for insulating electric conductors which provide the standing cabling in a telephone exchange. They must meet numerous dielectric strength and mechanical performance requirements, in particular when hot, and also, in the case of fire in the telephone exchange, firstly they must be difficult to burn, i.e. have a high oxygen index, and secondly, if they do burn, they must not evolve excessively corrosive fumes. The limiting oxygen index is a known index designating the minimum oxygen content, in an oxygen-nitrogen mixture, which will maintain combustion of a material disposed vertically in said mixture when the top of said material is lit.

The insulating material is constituted by a matrix of an organic polymer with possible additives, in particular fire-proofing agents.

Up till now, the most used substances in telephone exchanges have been polyvinyl chlorides which, already by their structure, have a high oxygen index but have the disadvantage of evolving corrosive hydrochloric acid fumes which are a great hindrance. Other materials can be used, e.g. polyamides, silicones or fluorinated derivatives, but high cost limits the use thereof.

Reticulated polyethylene can also be used, but reticulation requires high investment if the material is to be extruded at high speed. Copolymers of propylene and of ethylene, high-density polyethylene and thermoplastic polyesters can also be satisfactorily used due to their mechanical properties and to their resistance to ageing when hot, but, to be used, this type of substance requires effective fire-proofing, as does the previous type. The initial limiting oxygen index of copolymers of propylene and of ethylene with a low ethylene content is indeed close to 18, but it is necessary to obtain a limiting oxygen index of 27.

Numerous fire-proofing agents are known, but the problem of resistance to fire is made complex due to the fact that very various requirements must be met at the same time and that the action of the same fire-proofing agent varies as a function of the matrix and of the other additives.

In particular, these have been used trihydrated alumina and organic substances which contain chlorine or bromine, e.g hexabromocyclododecane, tetrabromoethane or aromatic halogenated compounds.

It is also known that a generator of free radicals added in small quantities can increase the efficiency of the fire-proofing agent.

An article by Eichborn (Amer. Chem. Soc. Div. Org. Coatings Platics Chem. Preprints, 23(1), 37(1964) and J. Appl. Polymer Sci., 8,2497 (1964)) mentions the use of dicumyl peroxide with an aliphatic brominated fire-proofing agent which is tetrabromoethane in a matrix of polystyrene.

U.S. Pat. No. 3,850,882 (Underwood et al.) mentions the use of a generator of carbon-carbon free radicals, i.e. in which the molecule breaks between two carbon atoms, with numerous and various brominated fire-proofing agents which, however, all contain at least one aromatic nucleus.

It must be observed that the use of a generator of carbon-carbon free radicals with various known aromatic compounds as fire-proofing agents such as decabromodiphenyloxide and 1-2 di(2,4,6-tribromophenoxyethane) also gives bad results. What is meant here by bad result is obtaining an oxygen index lower than 22 despite the addition of an optimum proportion of antimony oxide $Sb_2O_3$.

The present invention aims to produce a fire-proofed insulating material for an electric cable, having a high oxygen index, low chemical aggressivity of the fumes evolved in the case of combustion, good mechanical and electrical qualities, in particular when hot and when cold (coiling), good resistance to thermal ageing, while being inexpensive to manufacture.

THE INVENTION

It provides a fire-proofed insulating material for an electric cable, said material including:

(a) a matrix constituted by a synthetic polymer, (b) a fire-proofing agent constituted at least partially by an organic compound which contains bromine, and (c) an inorganic antimony compound which is capable of reacting with the bromine of the fire-proofing agent during combustion, wherein the improvement comprises:

(a) the synthetic polymer of the matrix is a substance included in the group constituted by the copolymers of propylene and of ethylene, high-density polyethylene and thermoplastic polyesters, and (b) the fire-proofing agent is halogenated and is formed by a cyclic derivative of pentaerythritol, an aliphatic or cycloaliphatic derivative, and is stable at the extrusion temperature of the matrix material and decomposes at a higher temperature, and in which at least the majority of the halogenated substituents are bromine atoms.

It also preferably has at least one of the following characteristics:

It further includes a generator of free radicals, the generator decomposing only at a temperature higher than the extrusion temperature of the matrix and being able to split in a homolytic way between two carbon atoms at said higher temperature.

The generator of free radicals is preferably a branched aliphatic hydrocarbon which contains phenyl nuclei and more particularly 2,3-dimethyl-2,3-diphenylbutane or 3,4-dimethyl-3,4-diphenylhexane.

The organic compound which contains bromine of the fire-proofing agent also contains phosphorus in its molecule, or else the fire-proofing agent is a mixture of organic compounds of bromine and red phosphorus.

The organic compound which contains bromine is chosen from the group constituted by 3,9-di(2,3-dibromopropoxy)-2,4,8,10-tetraoxa-3,9-diposphaspiro(5,5)undecane-3,9-dioxide, 3,9-di(2,2[dibromomethyl]-3-chloropropoxy)-2,4,8,10 tetraoxa-3,9 diphosphaspiro-(5,5)undecane-3,9-dioxide and hexabromocyclododecane.

The matrix material is polypropylene or a thermoplastic polyester and its fire-proofing agent 3,9-di(2,2-dibromomethyl-3-chloropropoxy)-2,4,8,10-tetraoxa-3,9 diphosphaspiro(5,5)undecane-3,9 dioxide, or else the matrix material is a copolymer of propylene and of ethylene, said copolymer containing less than 10% by weight of ethylene, and its fire-proofing agent is 3,9-di(2,3-dibromopropoxy)2,4,8,10-tetraoxa-3,9-diphosphaspiro(5,5)undecane-3,9-dioxide, or hexabromocyclododecane.

The proportion of the fire-proofing agent lies between 2% and 30% of the weight of the matrix material.

It also contains carbon black.

It has an expanded structure obtained by decomposing a pore-forming agent, preferably azodicarbonamide, which decomposes at the extrusion temperature of the matrix material.

The invention further relates to an electric cable which includes at least one sheath of material such as defined hereinabove and preferably an inner sheath and an outer sheath made of said material, said sheaths being separated by a casing of glass or mica fibre.

DESCRIPTION

In the case where the matrix is polypropylene or a thermoplastic polyester, 3,9-di(2,2-dibromomethyl-3-chloropropoxy)-2,4,8,10-tetraoxa-3,9,-diphosphaspiro(5,5)undecane-3,9-dioxide, will preferably be used as the fire-proofing agent and will be called hereinbelow fire-proofing agent A. It will be observed that the molecule of this compound contains phosphorus. The function of the phosphorus appears to be to slow down flame propagation, whether the phosphorus is incorporated in the molecule of the organic fire-proofing agent or added thereto in the form of red phosphorus. In particular, butane-1,4-diol polyterephthalate and tetramethylene glycol sold commercially under the trade name Hytrel by Messrs. Dupont de Nemours or the substance sold under the designation 1010-5 by Messrs. Koppers can be used as a thermoplastic polyester for the matrix material. By way of example, an intimate mixture of polypropylene and of 12.5% by weight of the fire-proofing agent A formed in a mixer then subjected to injection moulding gives a limiting oxygen index of 25.5 when tested in accordance with U.S. standard ASTMD-2863 to 1970. After addition of 0.5 part by weight of 2,3-dimethyl-2,3-diphenylbutane (the generator of free radicals), an oxygen index of 30 is obtained. An oxygen index of 27 is generally considered very satisfactory. In practice, it is necessary to add to the mixture an inorganic compound of antimony such as antimony oxide, to fix the bromine, the chlorine, the hydrobromic acid or the hydrochloric acid evolved by the decomposition of the fire-proofing agent.

In the case of a matrix constituted by a copolymer of propylene and ethylene, in which the proportion of ethylene is preferably lower than 10% by weight, 3,9-di(2,2-dibromomethyl)-3 chloro-propoxy)2,4,8,10-tetraoxa-3,9-diphosphaspiro(5,5)undecane-3,9 dioxide is preferably used as the fire-proofing agent and will be called hereinafter fire-proofing agent B, or hexabromocyclododecane, whose formula is:

$$\underbrace{-(CH_2)_2-(CHBr)_2-(CH_2)_2-(CHBr)_2-(CH_2)_2-(CHBr)_2-}$$

and which will be called hereinafter fire-proofing agent C. By way of example, a mixture of 100 parts of a copolymer of propylene and ethylene containing 2.8% of ethylene, of 15 parts of fire-proofing agent B or C and of 10 parts of antimony oxide, to which are added known anti-oxidants and anti-coppers (e.g. phenolic derivatives sold under the trade names Irganox 10-10 or 10-76 by Messrs. Ciba-Geigy) necessary for putting the material into use and for providing good ageing qualities for it is intimately stirred at a temperature of about 160° C. for a few minutes, then granulated and extruded round and conductive wire. Oxygen indices of 24.5 are obtained with fire-proofing agent B and of 29 are obtained with fire-proofing agent C. Repeating the test, adding to the mixture as a generator of free radicals 0.4% by weight of 2,3-dimethyl 2,3-diphenylbutane with fire-proofing agent B and 0.5% by weight of the same compound with fire-proofing agent C, produces oxygen indices of 29.5 and 32 respectively. With a mixture of 100 parts of a copolymer of propylene and of ethylene containing 2.8% of ethylene, 6 parts of fire-proofing agent C and 6 parts of antimony oxide, to which the same anti-oxidants and the same anti-coppers are added extruded round a conductor wire in the same way, oxygen indices of 25 are obtained when the mixture does not include a generator of free radicals and of 31 when there is added thereto 0.4% by weight of 2,3-dimethyl-2,3 diphenylbutane. The wires covered with the above materials also meet the chemical, electrical and mechanical requirements for cables used in telephone exchanges, in particular:

a flash point of more than 350° C., low chemical aggressivity after combustion, good dielectric strength, satisfactory maintenance of the mechanical properties after 5 days' ageing at 100° C., good mechanical strength at −10° C., uncoiling without cracking of deformation of a wire with a diameter of 1 mm on a mandrel with a diameter of 20 mm for one hour at 135° C., and good resistance to solvents, acids and bases.

The materials in which the organic fire-proofing agent does not include phosphorus in its molecule, in particular those containing fire-proofing agent C, aare not very flame-proof, but frame-proofing can be improved by adding a small quantity (about 2% by weight) of red phosphorus, or by adding another inorganic additive such as silica or alumina gel or magnesia, depending on how compatible it is with the copolymer which constitutes the matrix (magnesia being unsuitable, for example, with copolymers of propylene and ethylene).

Resistance to forming drops, when required, can be improved by addition of carbon black.

The material can be expanded by adding very fine grains of a chemical compound which decomposes at the extrusion temperature to evolve a gas, in particular azodicarbonamide and possibly also adding a nucleation agent.

Lastly, flame-proofing of the sheathed cables can be further improved with the above material by providing them with two coaxial sheaths of this material separated by glass or mica fibre, formed, for example, by a tape wound round the inner sheath.

It will be understood that, without going beyond the scope of the invention, various modifications can be made to the material and to the cable which have just been described, in particular by incorporating additives in the material to confer particular qualities to it.

We claim:

1. A fire-proofed insulating material for an electric cable, said material including:

(a) a matrix made of a synthetic polymer selected from the group consisting of copolymers of propylene and ethylene, high-density polyethylene, polypropylene, and thermoplastic polyesters;

(b) a fire-proofing agent selected from the group consisting of 3,9-di(2,3-dibromopropoxy)-2,4,8,10-tetraoxa-3,9-diphosphaspiro(5,5)-undecane-3,9-dioxide, 3,9-di(2,2-[dibromomethyl]-3-chloropropoxy)-2,4,8,10-tetraoxa-3,9-diphosphaspiro(5,5)undecane-3,9-dioxide and hexabromocyclododecane;

(c) an inorganic antimony compound which is capable of reacting with the bromine of the fire-proofing agent during combustion and (d) a generator of free radicals selected from the group consisting of branched aliphatic hydrocarbons containing four or six carbon atoms in the aliphatic chain thereof and containing phenyl substituents, decomposing only at a temperature higher than the extrusion temperature of said matrix, and being able to split in a homolytic way between two carbon atoms at said higher temperature.

2. A material according to claim 1, wherein said branched aliphatic hydrocarbon is 2,3 dimethyl-2,3-diphenylbutane or 3,4-dimethyl-3,4-diphenylhexane.

3. A material according to claim 1, wherein the matrix material is polypropylene or a thermoplastic polyester and the fire-proofing agent is 3,9-di(2,2[dibromomethyl]-3-chloropropoxy)-2,4,8,10-tetraoxa-3,9 disphosphaspiro(5,5)undecane-3,9 dioxide.

4. A material according to claim 1, wherein the matrix material is a copolymer of propylene and of ethylene said copolymer containing less than 10% by weight of ethylene, and the fire-proofing agent is 3,9-di(2,3-dibromopropoxy) 2,4,8,10-tetraoxa-3,9-diphosphaspiro(5,5)undecane-3,9-dioxide, or hexabromocyclododecane.

5. A material according to claim 1, wherein the proportion of the fire-proofing agent lies between 2% and 30% of the weight of the matrix material.

6. A material according to claim 1, wherein it also contains carbon black.

7. A material according to claim 1, wherein it has an expanded structure obtained by decomposing a pore-forming agent, preferably azodicarbonamide, which decomposes at the extrusion temperature of the matrix material.

* * * * *